(No Model.) 4 Sheets—Sheet 1.
L. E. WATERMAN.
PLANTER.
No. 480,304. Patented Aug. 9, 1892.
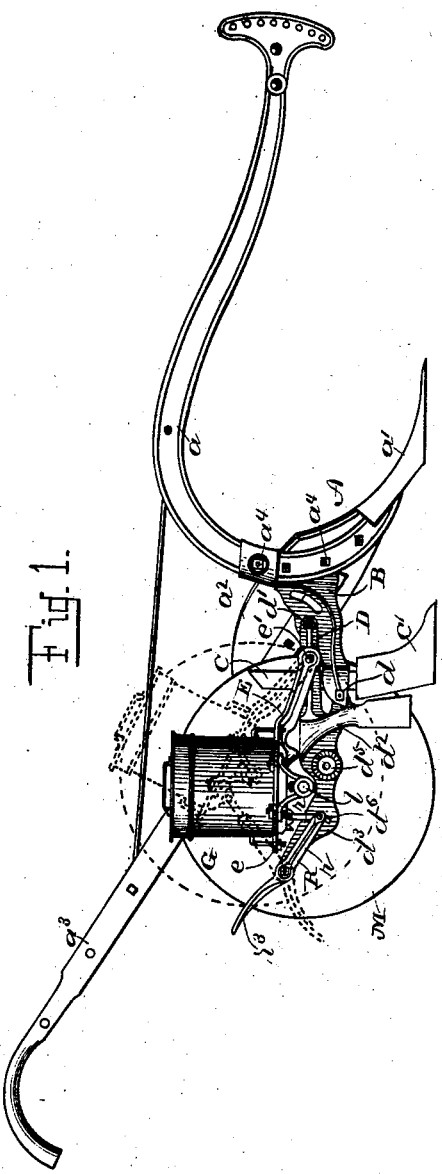
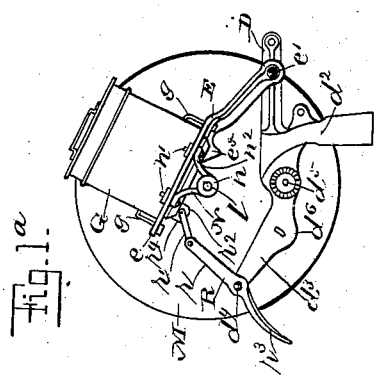
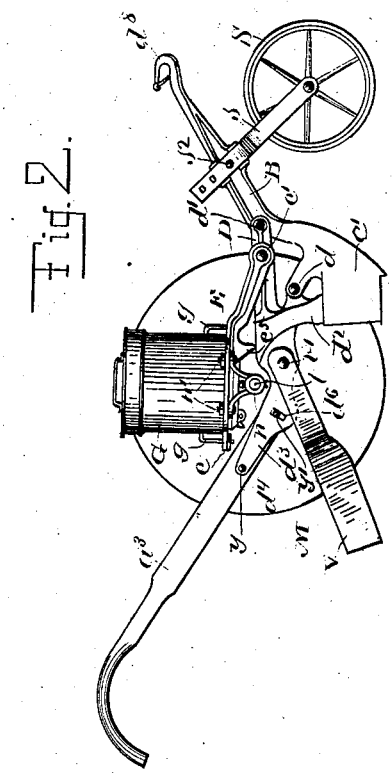
Witnesses:
Fred K. H. Davis
E. M. Meineke
Inventor:
Lewis E. Waterman,
by John R. Bennett
his att'y.

(No Model.) 4 Sheets—Sheet 2.

L. E. WATERMAN.
PLANTER.

No. 480,304. Patented Aug. 9, 1892.

Witnesses:
Fred K. N. Davis,
D. M. Meineke.

Inventor:
Lewis E. Waterman,
by John R. Bennett,
his Atty.

(No Model.) 4 Sheets—Sheet 3.
L. E. WATERMAN.
PLANTER.
No. 480,304. Patented Aug. 9, 1892.
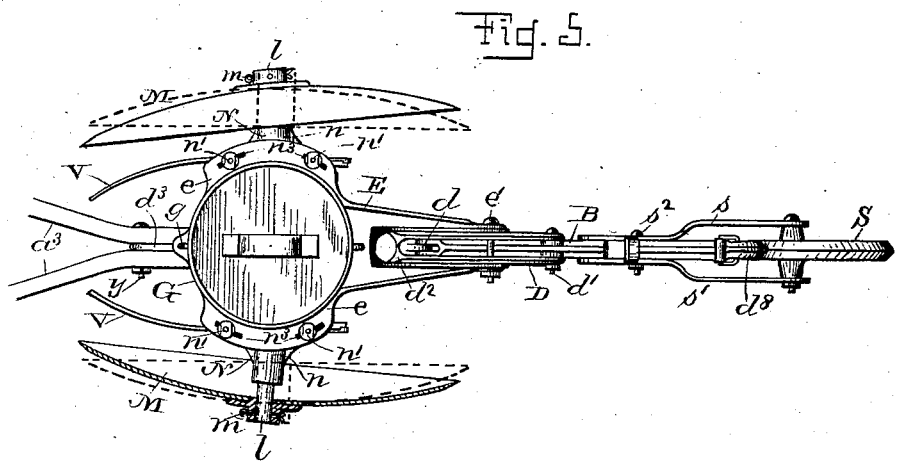
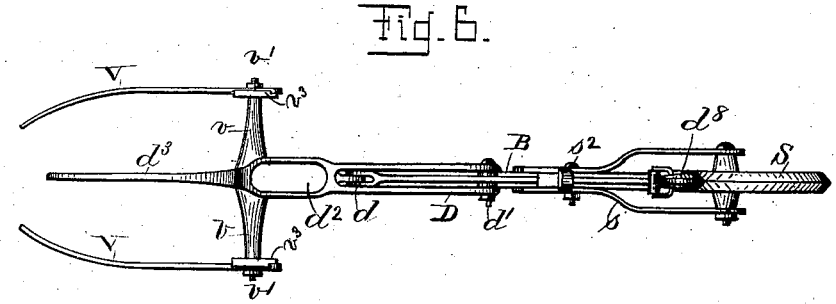
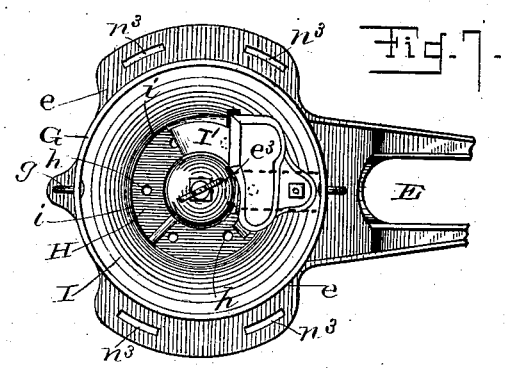 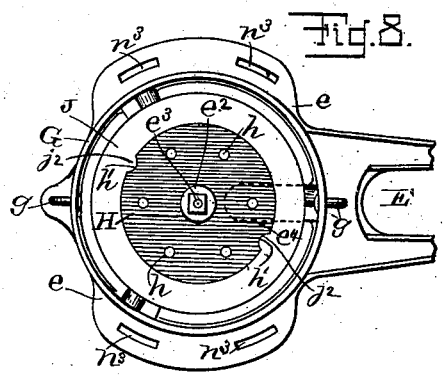
Witnesses:
Fred K. H. Davis
E. M. Meineke
Inventor:
Lewis E. Waterman,
by John R. Bennett,
his Atty.

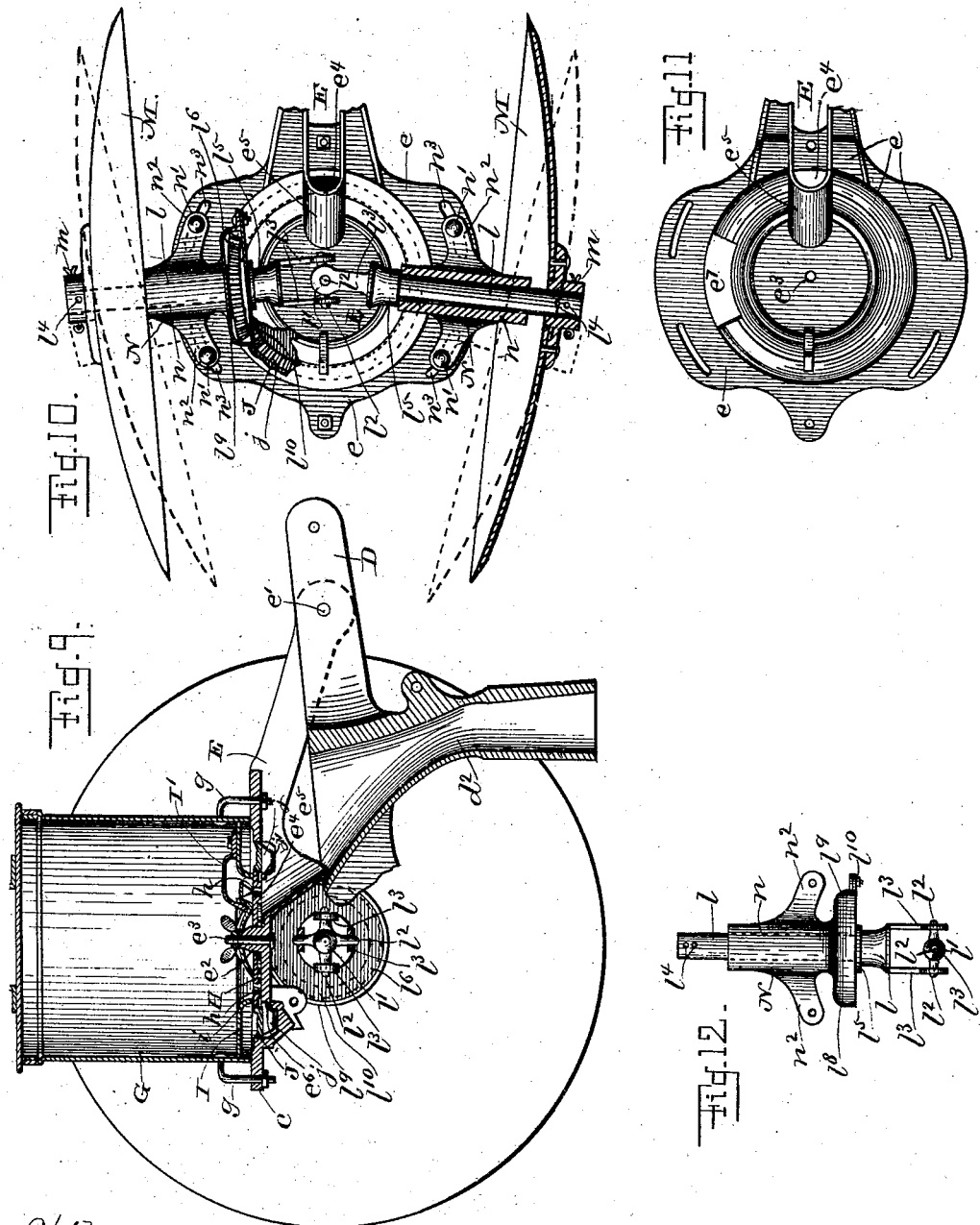

UNITED STATES PATENT OFFICE.

LEWIS E. WATERMAN, OF MOLINE, ILLINOIS, ASSIGNOR TO THE DEERE & COMPANY, OF SAME PLACE.

PLANTER.

SPECIFICATION forming part of Letters Patent No. 480,304, dated August 9, 1892.

Application filed April 2, 1892. Serial No. 427,551. (No model.)

*To all whom it may concern:*

Be it known that I, LEWIS E. WATERMAN, of the city of Moline, in the State of Illinois, have invented cerain new and useful Improvements in Planters, of which the following is a specification.

My invention relates to improvements in corn-planters.

The main object of the invention is to furnish planters in which disks are used of that class which cut, pulverize, and move the soil laterally, and in which the same disks are used for the purpose of supporting the seed dropping or measuring and delivering mechanism, for operating said seed-dropping mechanism, for pulverizing the soil, and for moving it laterally to cover the deposited seed; and to this end and object my improvement consists, in its main feature, in a planter the organization of which is such that disks such as are ordinarily used with disk harrows are adapted at the same time to support the seed-dropping mechanism of the planter, to operate said seeding mechanism, and to pulverize the soil and cover the deposited seed therewith.

In carrying out the main objects of my invention other subsidiary improvements are evolved, which consist in novel structural features and combinations of devices, the operation of which devices separately and in combination will be found hereinafter fully described and the novel combinations of which devices are specified in the claims of this specification.

The preferred construction of parts and arrangement thereof are illustrated in the accompanying drawings, in which—

Figure 3:
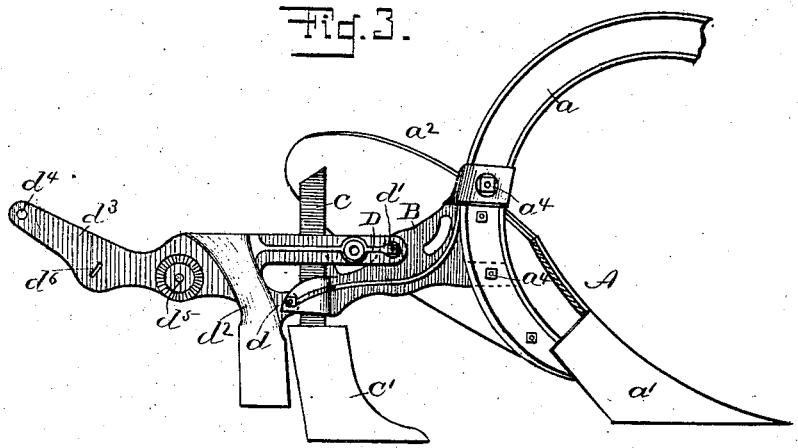
Figure 4:
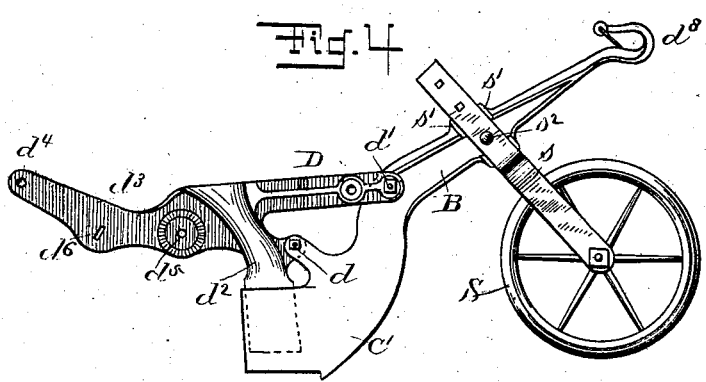

Figure 1 is a side elevation of my improved planter with the near disk removed to show parts otherwise obscured by it. In this figure the planting mechanism proper is shown as connected with a double-mold-board plow or lister-plow with one of its mold-boards and one handle removed to show other parts. Fig. 1ª is a side elevation of details hereinafter described; Fig. 2, a side elevation of my planter with the near disk removed, covering-blades fixed to the draft-frame, and the forward part of the draft-frame supported by a gage-wheel; Fig. 3, an enlarged side elevation of parts shown at Fig. 1, hereinafter described; Fig. 4, an enlarged side elevation of parts shown at Fig. 2, hereinafter described; Fig. 5, an enlarged top plan of the planter organized as shown at Fig. 2, but with one disk in sectional plan and both disks shown by broken and unbroken lines in different adjustments; Fig. 6, an enlarged top plan of the parts shown at Fig. 4 with the covering-blades attached; Fig. 7, an enlarged top plan of the seed-box with its cover removed to show its interior and a top plan of part of the swinging frame which carries the seed-box; Fig. 8, an enlarged top plan of the seed-box with its cover and the cap-plate over the seed-cup disk removed, and a top plan of part of the swinging frame which carries the seed-box; Fig. 9, an enlarged central sectional elevation of the seed-box, the dropping mechanism contained therein, the swinging frame to which the seed-box is fixed, and the seed-tube, and a side elevation of one driving-disk; Fig. 10, an enlarged plan, partly in section, of the seed-box, the dropping mechanism, the disks, and their gear connection with the seed-dropping mechanism, and parts of other adjacent parts, inverted; Fig. 11, an enlarged plan of the swinging plate or frame which carries the seed-box, inverted; Fig. 12, an enlarged plan of one section of the sectional disk-axle, which actuates the seeding mechanism, and of other adjacent parts, inverted.

In the different figures of the drawings the same reference-letter is used to designate the same part.

The main features of my improvements are of such nature that they may be incorporated in planters of different construction. I have deemed it sufficient, herein, however, to show and describe it as preferably used when used with a double-mold-board or lister plow, and also as when used with simply a supporting-wheel in front.

The lister-plow or double-mold-board plow A (shown at Fig. 1 and other figures of the drawings) is an ordinary plow of the kind, with a beam $a$, points $a'$, mold-boards $a^2$, and handles $a^3$ bolted to the mold-boards or other parts of the plow. Projecting rearwardly from the plow-beam $a$ is a bar or frame B, which is rigidly fixed at its front end to said plow-beam by bolts $a^4$. The rear end of the bar B is bifurcated and receives the standard $c$ of an ordinary small furrow-opener or subsoiler $c'$, which standard and furrow-opener can be adjusted vertically and are held after such adjustment by the clamping-bolt $d$.

D is a bar the forward end of which is forked and strides the bar B at its mid-length part. The bar D is fixed to the bar B by bolts $d\ d'$, and the bar B being fixed to the lister-plow the bars B and D thus become a rigid frame rigidly fixed to and in rear of the lister-plow. Integral with the bar D and at the mid-length part thereof is an ordinary seed-tube $d^2$, which is in rear of the furrow-opener $c'$. The rear end $d^3$ of the bar D is extended and has holes $d^4\ d^5$ and slot $d^6$ for purposes hereinafter described. The bars B and D are separable, for purposes hereinafter described, by removing the bolts $d\ d'$.

E is a plate or bar broadened at its rear end to form the bed plate or bottom $e$ for the seed-box G and with its front end portion bifurcated to stride the bar D, to which it is pivoted at its front end by a bolt $e'$. The seed-box G is fixed to the bed-plate $e$ by hook-rods $g$. (See Fig. 9.) The bed-plate $e$ has a central upwardly-projecting boss $e^2$, (see same figure,) on which the seed-cup disk H is journaled to revolve. A bolt $e^3$ projects through the boss $e^2$ and holds the seed-cup disk in place. The seed-cup disk is provided with a circular series of seed-cups $h$. An ordinary cap-plate I, with an arc-shaped opening $i$ corresponding to the circular disposition of the seed-cups and carrying a cut-off I', is located above the seed-cup wheel. The cut-off I' is located over an aperture $e^4$ in the bed-plate $e$, from which a spout $e^5$ projects. The seed-cup disk is revolved to carry the series of seed-cups around in a circular orbit by means of an annular plate J, the inner side of which rests upon an annular shoulder $e^6$ in the bed-plate $e$ to support the plate J as it is revolved. The plate J has an annular bevel cog-gear $j$ on its lower side. The seed-cup disk is located in the central opening of the annular plate J and rests on an annular shoulder $j'$ of the plate J, and is held to revolve with said annulus by lugs $j^2$ on the annulus J, which project into corresponding recesses $h'$ in the disk H. (See Fig. 8.) As the seed-cup plate revolves its seed-cups are brought successionally over the aperture $e^4$ and beneath the cut-off I' to discharge their contained quantities of seed to the seed-tube. Disks H with different sizes of seed-cups may be used for planting different kinds of seed.

The seed dropping or measuring and delivering mechanism in the seed-box, hereinbefore described, is an ordinary mechanism for the purpose and may be used with my improvements; or any other suitable seed measuring and delivering mechanism may be used, if preferred, with my improvements and without departing from the gist of my invention.

Transversely of and below the bed-plate $e$ is a divided axle L, or axle made in two parts, $l\ l$, the two parts of which are united by an ordinary universal joint consisting of a cross $l'$, to the outer ends of the diametrically-opposite arms $l^2$ of which are pivoted the two arms or branches $l^3$ of each part $l$ of the axle, as shown at Figs. 9 and 10. Any other ordinary joint with two axes of flexure to make it a universal joint will answer the purpose. A disk M, preferably of the concavo-convex type with sharpened periphery, is fixed to the outer end of each part $l$ of the axle (see Fig. 10) by a split spring-key $m$, which may be inserted through either of a series of holes $l^4$ in the axle and through the hub of the disk for the purpose of adjusting the distance between the disks, and the parts $l$ project beyond their bearings $n$ for that purpose. Each part $l$ of the axle has thereon a fixed collar $l^5$, which revolves against the inner end of the adjacent bearing $n$, and these collars take the end-thrust of each disk and prevent either disk acting to move the part axle of the other disk lengthwise of itself.

The brackets N have each a journal-bearing $n$, in which one of the parts $l$ of the divided axle is journaled. These journal-bearings are preferably elongated (see Fig. 10) to hold the axle parts in proper alignment, but may have multiple bearings for the same purpose. The brackets N are adjustably fixed one to each side of the bed-plate $e$ by bolts $n'$, which pass through holes in the side arms $n^2$ of the bracket and through slots $n^3$ in the bed-plate $e$, which slots are concentric with the annular plate J. One of the parts $l$ of the axle has fixed upon it a bevel-wheel $l^6$ in such position that it projects through an opening $e^7$ (see Fig. 11) in the base-plate $e$, where its cogs engage with the circular series of counterpart cogs on the lower side of the annular plate J. (See Fig. 10.)

By loosening the nuts on the bolts $n'$ the brackets N, with the bearings $n$, which are integral with or fixed thereto, can be adjusted to adjust the part axles $l$ in different radial positions relatively to the annular plate J and the seed-cup wheel, and after such adjustment the parts may be again fixed to each other by tightening the nuts on the bolts $n'$. By such adjustment of the bearings $n$ and the parts $l$ of the axle the angle of the disks M to the line of travel of the planter can be adjusted, as may be desired, for the purpose of causing the disks to throw or move the soil more or less toward the row of deposited seeds, as may be required, in different kinds of soil and in different conditions of the same soil. One such adjustment of the disks M is shown or indicated by dotted lines at Fig. 10. In all these adjustments of the axle, with its two parts $l$ in different radial positions and at different angles to each other for the purpose of adjusting the disks M, as described, the pinion $l^6$ will be swung in the arc of a circle corresponding with the circular position of the series of cogs $j$ of the annular plate J, and hence remain in gear with and for properly actuating said plate J, and with it the seed-cup wheel, and in all of such adjustments the two parts l of the axle, in view, mainly, of their coupling to each other, will be rotated simultaneously, so that either disk at any time running in such soil as might not rotate the axle regularly, the other disk at the same time being in better soil, will tend to produce a more uniform rate of velocity of rotation of the disks, and hence uniform and regular velocity of revolution of the seed-cup wheel, and thereby uniform deposit of seed throughout the rows thereof. It will be evident, however, that the adjustable two parts l of the axle L may be independent of each other, or not coupled with each other, and that such construction is embodied in my improvement; but I prefer the parts l, coupled to rotate with each other, mainly for the reasons given—that is, that more uniform planting will be secured when both disks are depended upon to operate the mechanism for measuring and delivering the seed to the conductor-tube or seed-tube. It will be evident that the annular plate J may be dispensed with and the seed-cup plate H be enlarged and provided with a circular series of cogs, such as J, whereby the seed-cup wheel will receive its motion direct from the pinion $l^6$ without departing from the gist of my invention in this respect; but I prefer to use the interposed annular plate J to facilitate substitution of different seed-cup disks of simple form. The pinion $l^6$ is provided with a housing $l^8$, which is formed of a curved plate $l^9$, fixed to or integral with the bearing $n$ and a plate $l^{10}$, bolted to the plate $l^9$.

The lever R (see Figs. 1 and $1^a$) is pivoted at its mid-length portion to the rear end of the extension $d^3$ of the bar D, and one of its ends $r$ is pivotally connected with one end of a link $r'$, the other end of which is pivotally connected with a lug $r^2$, which is pendent from the bed-plate $e$. When the planter is in operation in the field, the lever R is in the relative position to the other parts. (Shown by full lines at Fig. 1.) The operator or driver can by placing his foot on the free end $r^3$ of the lever R turn or swing said lever, and thereby tilt or raise the rear end of the bar E and with it the seed-box, seed measuring and delivering mechanism, and the disks M, as shown by dotted lines at Fig. 1 and by full lines at Fig. $1^a$, and thereby stop the operation of the seeding mechanism. When the lever R is turned into the position shown at Fig. $1^a$, the link $r'$ will come in contact with a lug $r^4$, and thereby lock the parts in the relative positions shown at same figure until they are released by raising the rear end of the lever R, and thereby lowering its front end and restoring the parts to their relative positions (shown at Fig. 1 by full lines) and ready for planting.

It will be seen from the foregoing description that the disks M support the seed-box and its contained seeding mechanism, that the same disks by their rotation actuate the seed measuring and delivering mechanism, and that the same disks when set at an angle with the line of draft pulverize the soil at each side of the row of seeds being planted, and throw it or move it toward said row of deposited seeds for the purpose of covering them, and the combination of disks having such functions with a seed measuring and delivering mechanism, with which they are combined as described, constitutes the main feature or gist of my invention.

The lister-plow A operates to turn a furrow-slice of the uppermost soil laterally in both directions or opposite directions. The furrow-opener $c'$ opens a furrow for the seed and to some extent loosens the soil in the bottom part of or below the furrow made by the lister-plow. The seed measuring and delivering mechanism in the seed-box operated by the disks M deliver the seed to the seed-tube $d^2$, which conducts them to the furrow opened by the furrow-opener $c'$, and where they are deposited in what is known as "drill-planting," and are covered with soil pulverized and loosened by the disks M in the bottom of the furrow made by the plow A and thrown or moved by said disks toward and over the row of seed to a depth controlled by the adjustment of the disks, as hereinbefore described—that is, the nearer the disks rotate in planes parallel with the line of travel of the planter the less soil they will throw toward the row of seed. The planter, when including the lister-plow, as shown at Fig. 1, can be used and is adapted for planting in soil without previous plowing, or it may be used in land already plowed.

At Figs. 2, 4, 5, and 6 I have shown the bar B of a slightly-different form from that shown at other figures and with its front end extended and terminated by a hook $d^8$, to which the draft-animals may be hitched. The forwardly-extended end of the bar B is supported by a wheel S, which is journaled to a standard that strides the bar B and is adjustably held thereto by ledges $s'$ and a bolt $s^2$. By removing the lister-plow and substituting a bar B such as shown at Figs. 2, 4, 5, and 6 for the bar B shown at Figs. 1 and 3 the planter is adapted for planting in ordinary prepared soil without the use of the lister-plow, which may then be used alone.

In soil of such nature or in such condition as to adhere to the disks when adjusted to rotate in planes oblique to the line of travel of the planter the disks may be adjusted, as shown by broken lines at Fig. 5, to rotate in planes parallel with the line of travel of the planter and to move no soil toward the deposited seed, and in such case covering-blades V of ordinary construction may be used to cover the seed. These blades are secured to the extended rear end of the bar D, as shown at Figs. 2 and 6, by spacing-sleeves $v$ and bolt $v'$. The adjacent surfaces between the sleeves and bar D are roughened, as shown, and ledges $v^3$ on the outer end of the sleeves embrace the blades V, and thus the blades are securely and adjustably held in place. When the lister-plow is removed and the gage-wheel S used, which is adjustable, as shown, to control the depth of planting, then the handles $a^8$ are adjustably fixed to the extended end $d^3$ of the bar D by a pivoting-bolt $y$ and a fixing-bolt $y'$, which bolt $y'$ passes through the handles and through the slot $d$.

The action of the soil in forcing the disks M from each other is well understood, and this action of the soil on both disks will aid in guiding the planter in a direct line.

Having thus described my invention, what I claim as new, and desire to secure by Letters Patent, is—

1. In a corn-planter, the combination, substantially as hereinbefore described, of a seed-box, mechanism for measuring and delivering seed from the box, co-operating disks on either side of the box, which disks carry or support the seed-box and the measuring and delivering mechanism and which actuate the latter, and means for adjusting the disks, so as to vary their covering capacity.

2. In a corn-planter, and in combination, substantially as hereinbefore described, a seed-box, mechanism for measuring and delivering seed from the seed-box to the seed-tube, disks on either side of the box, adapted to support said box and the measuring and delivering mechanism, a divided axle to which said disks are fixed to rotate therewith and the two parts of which are coupled to rotate with each other, and a pinion fixed to one of said parts and geared with and to operate the seed measuring and delivering mechanism in the seed-box.

3. In a corn-planter, and in combination, substantially as hereinbefore described, a seed-box, mechanism for measuring and delivering seed from the seed-box to the seed-tube, disks on either side of the box, adapted to support said box and measuring and delivering mechanism, said disks being fixed to a divided axle the two parts of which are coupled to each other and which are adjustable to change the angle of the disks to the line of travel of the planter, and a pinion fixed to one of the parts of the axle and geared with to operate the seed measuring and delivering mechanism in the seed-box.

4. In a corn-planter, and in combination, substantially as hereinbefore described, a seed-box, mechanism for measuring and delivering seed from the seed-box to the seed-tube, disks on either side of and adapted to support said box and measuring and delivering mechanism, said disks being fixed to a divided axle the two parts of which are coupled to each other, a pinion carried on one of said parts of the axle, and means for adjusting the two parts of the axle to adjust the angle of the disks to the line of travel of the planter and in such manner as to adjust the pinion concentrically with the circular series of counterpart cogs with which it gears to actuate said seed-measuring mechanism.

5. In a corn-planter, and in combination, substantially as hereinbefore described, a seed-box, mechanism for measuring and delivering seed from the seed-box to the seed-tube, disks on either side of the box, adapted to support said box and measuring and delivering mechanism, an axle in two parts, each part of which has one of said disks fixed thereto, a pinion on one of the parts of the axle, which pinion gears with and actuates the seeding mechanism referred to, and means for adjusting said disks at different angles to the line of travel of the planter.

6. In a corn-planter, in combination with a lister-plow, a drag-bar, as B, fixed to and in rear thereof and provided with a furrow-opener, another drag-bar, as D, fixed thereto and provided with a seed-tube, and a frame or bar, as E, hinged to the bar D at one end and provided with a seed-box having seed measuring and delivering mechanism supported by disks, as M, with an axle fixed thereto and provided with a pinion which gears with said seed measuring and delivering mechanism, substantially as described.

7. In a corn-planter, in combination with a lister-plow, a drag-bar B, removably fixed thereto and provided with a furrow-opener, another drag-bar D, removably fixed to the bar B and provided with a seed-tube, whereby said bar B may be substituted by another not fixed to a lister-plow, a seed-box provided with seed measuring and delivering mechanism and mounted on an arm E, hinged to the bar D, and disks, as M, fixed to a divided axle to support said seed-box, which axle gears with and operates the seed mechanism referred to, substantially as described.

8. In a corn-planter, in combination with a drag-bar, a seed-box having seed measuring and delivering mechanism carried on a bar hinged to said drag-bar, and a lever, as R, pivoted between its ends to the drag-bar and having a link connection therewith, whereby the box may be raised and lowered, substantially as described.

9. In a corn-planter, in combination with a drag-bar, as D, and bar, as E, hinged thereto and having a seed-box mounted thereon and provided with seed measuring and delivering mechanism, a lever R, hinged to the rear end of bar D, link $r$, and detent-lug $r^4$, substantially as described.

10. In a corn-planter, in combination with a lister-plow and drag-bars in rear thereof, a frame hinged to said drag-bars and provided with a seed-box at its free end having seed measuring and delivering mechanism, a lever R, hinged to said drag-bars, a link $r$, pivotally connected with said lever and with a lug on the swinging bar, and a detent for locking said lever when turned to elevate the seed-box, substantially as described.

11. In a corn-planter, in combination with a drag-bar, a frame hinged to said bar and carrying a seed-box at its rear, said box having seed measuring and delivering mechanism, a two-part axle journaled in said frame and carrying supporting, pulverizing, and covering disks, a pinion fixed to said axle and geared with and to operate said seed measuring and delivering mechanism, and means for independently adjusting the parts of the axle, substantially as described.

12. In a corn-planter, in combination with a lister-plow, drag-bars in rear thereof, a frame or bar hinged to said drag-bars, a seed-box mounted on said swinging frame and provided with a seed measuring and delivering mechanism, disks fixed to a divided axle to support said seed-box and its contained mechanism and adjustable to change their angle to the line of travel of the planter, and a pinion fixed to said axle and geared with to operate said seeding mechanism, substantially as described.

13. In a corn-planter, in combination with a lister-plow, drag-bars in rear thereof, a frame or bar hinged to said drag-bars, a seed-box mounted on said swinging frame and provided with a seed measuring and delivering mechanism, disks fixed to a divided axle to support said seed-box and its contained mechanism and adjustable to change their angle to the line of travel of the planter, and a pinion fixed to said axle and geared with to operate said seeding mechanism, and a lever, as R, for raising and lowering said seed-box and disks, substantially as described.

14. In a corn-planter, the combination of a main frame, a supplemental frame pivoted thereto and carrying a seed box or receptacle and seed measuring and delivering mechanism, a two-part axle journaled in the supplemental frame and carrying disks acting to support the box and its contained mechanism on either side of the same and to pulverize the soil and cover the seed, and means for adjusting the parts of the axle so as to set the disks to throw more or less of the soil onto the seed.

15. In a corn-planter, the combination of a drag-bar, as B, a supplemental drag-bar, as D, secured thereto, a furrow-opener carried by the main drag-bar, a spout or tube carried by the supplemental drag-bar, a pivoted frame carrying a seed-box and measuring and delivering mechanism, an axle journaled in the pivoted frame and carrying wheels or disks for supporting the box and its contained mechanism and pulverizing the soil and covering the seed, and mechanism between the axle and the measuring and delivering mechanism for actuating the same.

In testimony whereof I have signed my name to this specification in the presence of two subscribing witnesses.

LEWIS E. WATERMAN.

Witnesses:
C. H. POPE,
D. J. WEBB.